United States Patent
Ooiwa (10) Patent No.: US 6,515,392 B2
(45) Date of Patent: Feb. 4, 2003

(54) VEHICLE AC GENERATOR

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/988,741

(22) Filed: Nov. 20, 2001

(65) Prior Publication Data

US 2002/0063488 A1 May 30, 2002

(30) Foreign Application Priority Data

Nov. 30, 2000 (JP) ........................................ 2000-365235

(51) Int. Cl.⁷ .............................. H02K 3/00; H02K 3/12; H02P 1/100
(52) U.S. Cl. .................. 310/179; 310/71; 310/201; 310/184; 310/180
(58) Field of Search ................................. 310/201, 184, 310/180, 179, 71

(56) References Cited

U.S. PATENT DOCUMENTS

| | | | | |
|---|---|---|---|---|
| 5,394,045 A | * | 2/1995 | Takehara | 310/184 |
| 5,449,962 A | * | 9/1995 | Shichijyo | 310/184 |
| 5,998,903 A | * | 12/1999 | Umeda | 310/179 |
| 6,002,219 A | * | 12/1999 | Permuy | 310/139 |
| 6,181,044 B1 | * | 1/2001 | Umeda | 310/201 |
| 6,252,320 B1 | * | 1/2001 | Ballard | 310/68 |
| 6,198,190 B1 | * | 3/2001 | Umeda | 310/179 |
| 6,201,332 B1 | * | 5/2001 | Umeda | 310/184 |
| 6,268,678 B1 | * | 7/2001 | Asao | 310/201 |
| 6,285,104 B1 | * | 9/2001 | Nashiki | 310/184 |
| 6,333,573 B1 | * | 12/2001 | Nakamura | 310/45 |
| 6,335,583 B1 | * | 1/2002 | Kusase | 310/254 |

OTHER PUBLICATIONS

"Rectifier Unit of Vehicle AC Generator", Journal of Denso Technical Disclosure 124–068, Jul. 15, 1999 w/partial translation.

"Vehicle AC Generator", Journal of Denso Technical Disclosure125–040, Oct. 15, 1999 w/partial translation.

* cited by examiner

Primary Examiner—Karl Tamai
Assistant Examiner—Iraj A Mohandesi
(74) Attorney, Agent, or Firm—Oliff & Berridge, PLC (57) ABSTRACT

A vehicle AC generator includes a stator core, a stator winding and a rectifier unit. The stator winding is comprised of plural phase-windings, plurality of first, second and third connection segments. Each phase-winding is comprised of plural U-shaped conductor segments and a pair of inclined portions. Each pair of the phase-windings that generates AC voltages a 180-degree-electric-angle different from each other is connected by one of the first connection segments to form a series-connected phase-winding. The series-connected phase-windings are connected by the second connection segments to form a multiple-phase stator winding that is connected to the rectifier unit.

10 Claims, 13 Drawing Sheets

VEHICLE AC GENERATOR

CROSS REFERENCE TO RELATED APPLICATION

The present application is based on and claims priority from Japanese Patent Application 2000-365235 filed Nov. 30, 2000, the contents of which are incorporated herein by reference.

BACKGROUND OF THE INVENTION

1. Field of the Invention

The present invention relates to a vehicle AC generator to be mounted in a passenger car, a truck, or the like.

2. Description of the Related Art

Recently, an engine compartment of a car has been narrowed in order to reduce running resistance of the car without sacrificing the space of the passenger compartment. On the other hand, rotation speed of engines is lowered to reduce fuel consumption of the engines.

Therefore, the vehicle AC generator is required to be more compact and more powerful.

U.S. Pat. No. 5,998,903 discloses a compact and powerful vehicle AC generator that employs a plurality of rectangular conductor segments that are connected, by means of welding, to provide a three-phase stator winding.

However, in order to provide higher output voltage to meet a specific demand, the number of turns has to be increased. More number of turns necessitates more number of the conductor segments, which necessarily makes connection work of the conductor segments complicated and troublesome.

SUMMARY OF THE INVENTION

Therefore, a main object of the invention is to provide a compact and powerful vehicle AC generator that can provide a comparatively high AC voltage, without necessitating complicated connection work.

According to a feature of the invention, a vehicle AC generator includes a stator core, a stator winding, a rectifier unit. The stator winding is comprised of a plurality of phase-windings, a plurality of first connection segments and a plurality of second connection segments. Each phase winding is comprised of a plurality of U-shaped conductor segments, and each conductor segment has a turn portion forming a first coil-end group disposed on an end of the stator core and a pair of inclined portions forming a second coil-end group disposed on the other end of the stator core. Each pair of the phase-windings that generates AC voltages a 180-degree-electric-angle different from each other is connected by one of the first connection segments to form a series-connected phase-winding. The plurality of series-connected phase windings is connected by the second connection segments, and the first and second connection segments are disposed circumferentially spaced apart from each other.

Therefore, connection and wiring of the stator winding is equally distributed along the coil-end group, and conductor members do not overlap each other.

The stator winding may be comprised of 12 phase-windings that are different in phase from each other and six third connection segments for series connecting those of the phase windings other than the series connected phase windings connected by the first connection segments.

Preferably, the third connection segment extends along one of the coil end groups and disposed one of three portions that are circumferentially spaced apart from each other, and at least a portion of the second connection segment extends along one of the coil-end groups.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle AC generator according to a preferred embodiment of the invention is described with reference to the appended drawings.

Figure 1:
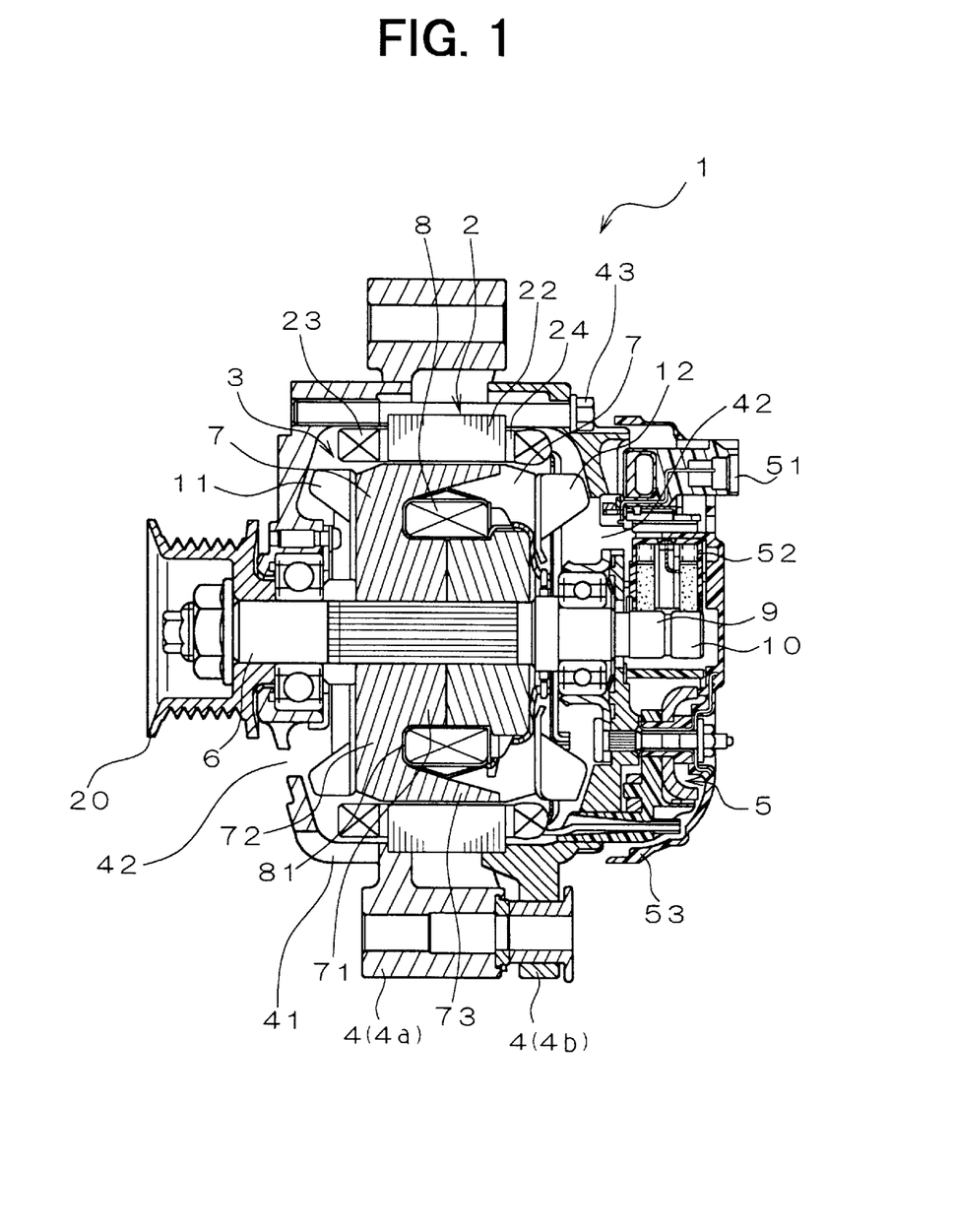
FIG. 1 is cross-sectional side view illustrating a vehicle AC generator according to a preferred embodiment of the invention.

As shown in FIG. 1, the vehicle AC generator according to the first embodiment is comprised of a stator 2, a rotor 3, a frame 4, a rectifier unit 5, etc.

The stator 2 is comprised of a stator core 22, a stator winding 23 and a plurality of insulators 24 for insulating the stator winding 23 from the stator core 22.

The stator core has a plurality (e.g. 96) of slots formed at the inner periphery thereof. The stator core 22 is a laminate of a plurality of thin steel sheets. The stator winding 23 is comprised of a plurality of conductor segments welded each other. The rotor 3 rotates together with a shaft 6 and is comprised of a pole core 7, a field coil 8, a pair of slip rings 9 and 10, a mixed-flow type cooling fan 11 and a centrifugal cooling fan 12. The shaft 6 is connected to a pulley 20, which is driven by a vehicle engine.

The pole core 7 is comprised of a pair of core members, each of which has a cylindrical boss portion 71, a radially extending disk portion 72 and a plurality of claw poles 73 that extends axially from the disk portion 72. The pair of core members is disposed so that the claw poles 73 of one member interleave the claw poles 73 of the other. The field coil 8 is fitted to the inner wall of the claw poles 73 under a certain pressure. The field coil 8 is enveloped by a resin-impregnated sheet of insulation papers 81. The insulation paper 81 is heat-treated so that it sticks to the field coil 8.

The mixed-flow type cooling fan 11 is welded to the front surface, which is near from the pulley 20, of the pole core 7, and the centrifugal cooling fan 12 is welded to the rear surface, which is remoter from the pulley 20, of the pole core 7. The projected area of fan blades of the mixed-flow type cooling fan in the rotation direction is smaller than the projected area of fan blades of the centrifugal fan in the rotation direction.

The frame 4 accommodates the stator 2 and the rotor 3 so that the rotor 3 can rotate within the stator 2. The frame 4 is comprised of a front frame 4a and rear frame 4b, which are fastened by a plurality of through bolts together with the stator 2. The frame 4 has a plurality of air discharge windows 41 at portions thereof corresponding to portions of the stator winding 23 extending from the stator core 22 and a plurality of air intake windows at axial end portions thereof. The rectifier unit 5 and a brush unit 52 are disposed tigether at an outside surface of the rear frame 4b and covered by a rear cover 53. The rectifier unit 5 is connected to output power lines of the stator winding 23 and converts three-phase AC power generated thereby into DC power.

When the pulley 20 of vehicle AC generator 1 is driven by a vehicle engine via a belt, the rotor 3 rotate in a prescribed direction. When the field coil 8 is energized from outside, the claw poles 73 are excited so that the stator winding 23 generates three-phase AC power, which is converted by the rectifier unit 5 into DC power.

Figure 3:
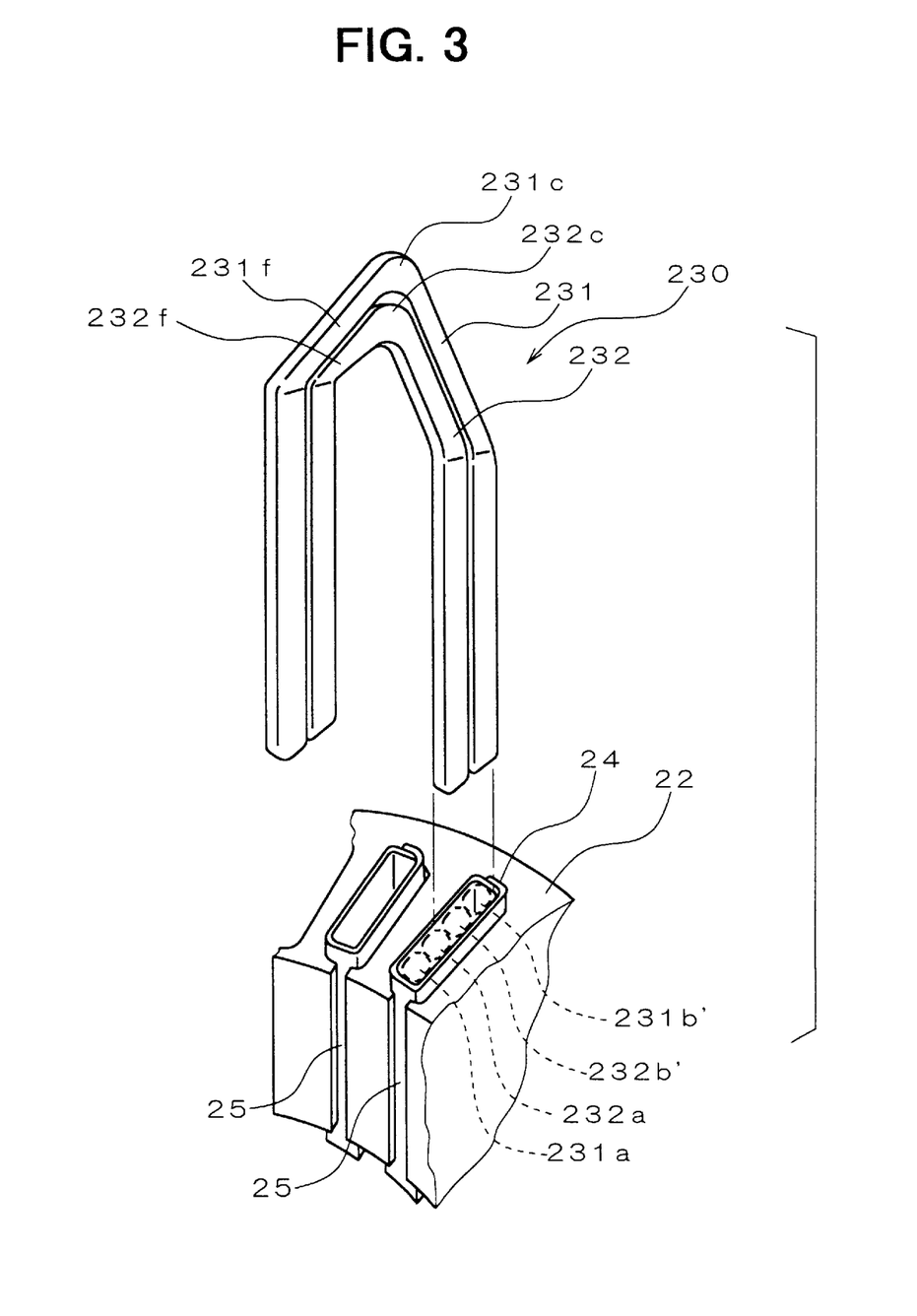
FIG. 3 is a schematic diagram illustrating a step of mounting the conductor segments shown in FIG. 2 in a stator core of the vehicle AC generator shown in FIG. 1.

The stator winding 23 is comprised of a plurality of basic pairs 230 of U-shaped large and small conductor segments 231 and 232, which are disposed in four layers in the slots, as shown in FIG. 3. The large conductor segment 231 has an innermost conductor member 231a to be disposed in a radially inner most layer of a slot 25, an outermost conductor member 231b to be disposed radially outermost layer of another slot and a turn portion 231c connecting the two conductor members 231a and 232b. In the same way, the small segment 232 has an inner middle conductor member 232a to be disposed in a radially inner middle layer of a slot 25, an outer middle conductor member 232b to be disposed in radially outer middle layer of another slot and a turn portion 232c connecting the two conductor members 232a and 232b.

The innermost conductor member 231a of each large conductor segments 231 is disposed in a slot, while the outermost conductor member 231b of the same conductor segment 231 is another slot that is a pole-pitch (e.g. 6 slot-pitches) clockwise spaced apart from the slot. In the same manner, the inner middle conductor member 232a of each large conductor segments 232 is disposed in a slot, while the outer middle conductor member 232b of the same conductor segment 232 is disposed in another slot that is a pole-pitch (e.g. 6 slot-pitches) clockwise spaced apart from the slot. The turn portion 232c of the small conductor segments 232 is covered by the turn portion 231c of the large conductor segments 231. In other words, the turn portion 232c forms an inside coil end at an axial end of the stator core 22 and the turn portion 231c forms an outside coil end at the same axial end of the stator core 22.

Figure 2:
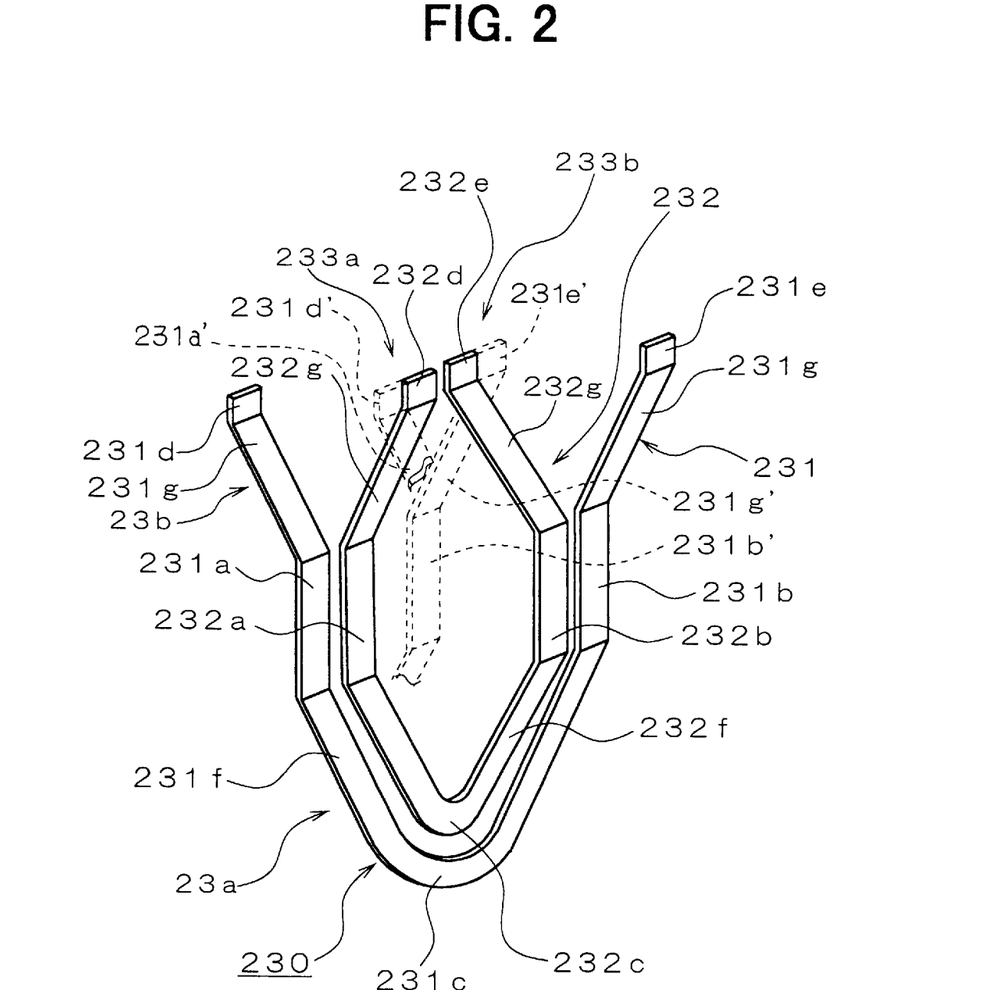
FIG. 2 is a perspective view of conductor segments of a stator winding of the vehicle AC generator shown in FIG. 1.

At the other end of the stator core 22, the inner middle conductor member 232a is connected, at a joint portion 233a, by welding or the like to an innermost conductor member 231a' that is disposed in one of the slots 25 that is a pole-pitch clockwise spaced apart from the slot in which the inner middle conductor member 232b is disposed, as shown in FIG. 2. In the same manner, an outermost conductor member 231b' is connected, at a joint portion 233a, to the outer middle conductor member 232b. The outermost conductor member 231b' is disposed in one of the slots 25 that is a pole-pitch clockwise spaced apart from the slot 25 where the outer middle conductor member 232b.

The large segment 231 has inclined portions 231f and 231g and end portions 231d and 231e, and the small segment 232 also has inclined portions 232f and 232g and end portions 232d and 232e. The inclined portions 231f and 232f form a first coil-end group that project from an axial end of the stator core 22, and the inclined portion 231g and 232g form a second coil-end group that project from the other end of the stator core 22. The end portion 231d or 231e forms one of the joint portions, such as the joint portion 233a or 233b, together with another corresponding end portion of another conductor member.

Figure 4:
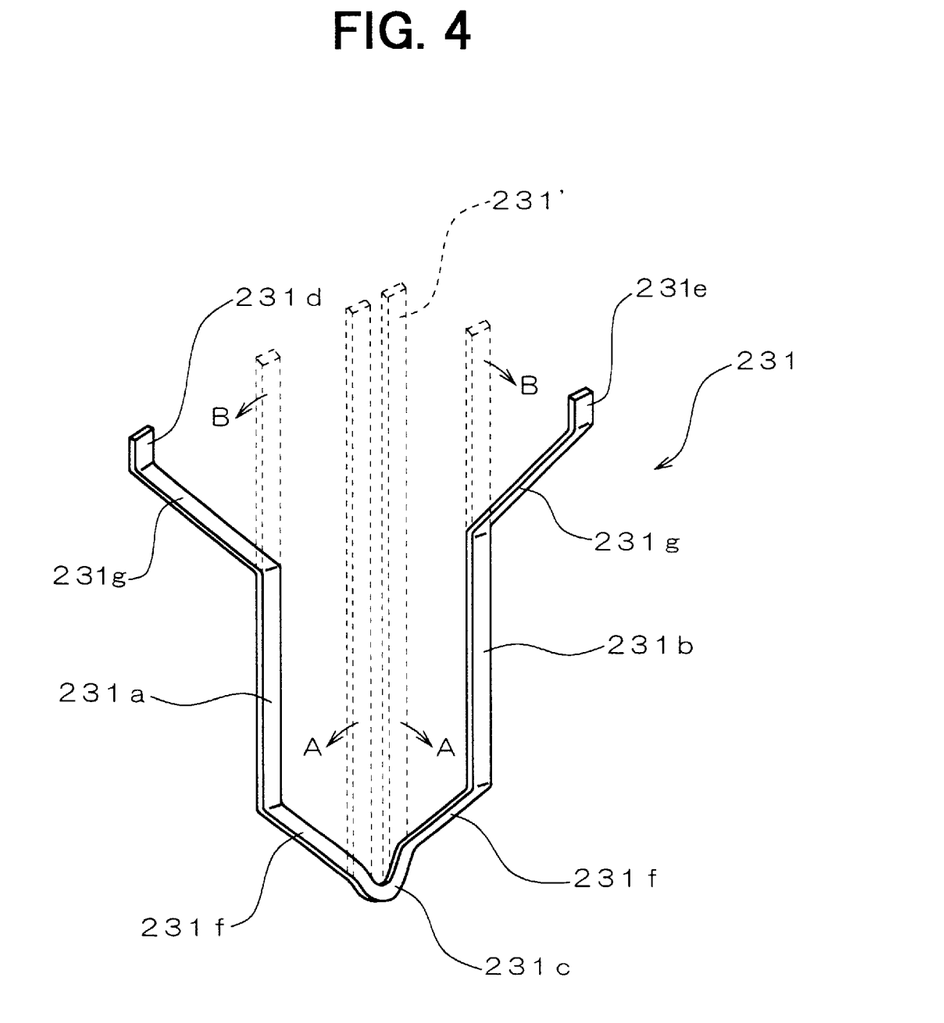
FIG. 4 is a schematic diagram illustrating a step of forming one of the conductor segments shown in FIG. 2.

As shown by dotted lines in FIG. 4, the large segment 231 is formed of a hairpin-shaped rectangular copper wire 231', which is expanded in directions A to form a U-shaped conductor segment having a pair of the inclined portions 231f and a pair of straight portions that include the conductor members 231a and 231b. The straight portions are respectively inserted into a pair of the slots 25, in the manner described above, together with the insulators 24. Thereafter, each of the straight portions is bent in circumferentially opposite outward directions to form a pair of the inclined portions 231g and a pair of the end portions 231d and 231e. The small segment 232 is also formed of a hairpin-shaped rectangular copper wire 231' in almost the same manner. However, each of the straight portions is bent in circumferentially inward directions to form a pair of the inclined portions 232g and a pair of the end portions 232d and 232e. Thus, the end portions 231d and 232d of the neighboring conductor members 231a and 232a are disposed to be remote from each other, and the end portions 232e and 231e of the neighboring conductor members 231b and 231b are disposed remote from each other. Thus, each of the end portions 231d and 231e of the large conductor segment 231 is connected, by welding or the like, to end portions of other small conductor segments 232, as described above, thereby forming a second coil-end group that projects from the other axial end of the stator core 22.

Ordinarily, a pair of the large segment 231 and the small segment 232 is piled and inserted into a pair of slots 25 so that the circumferentially opposite sides of the conductor members 231a, 231b, 232a and 232b are fitted to parallel inner walls of the corresponding slots 25 and so that the turn portion 231c of the large segment 231 mounts on the turn portion 232c of the small segment.

Figure 5:
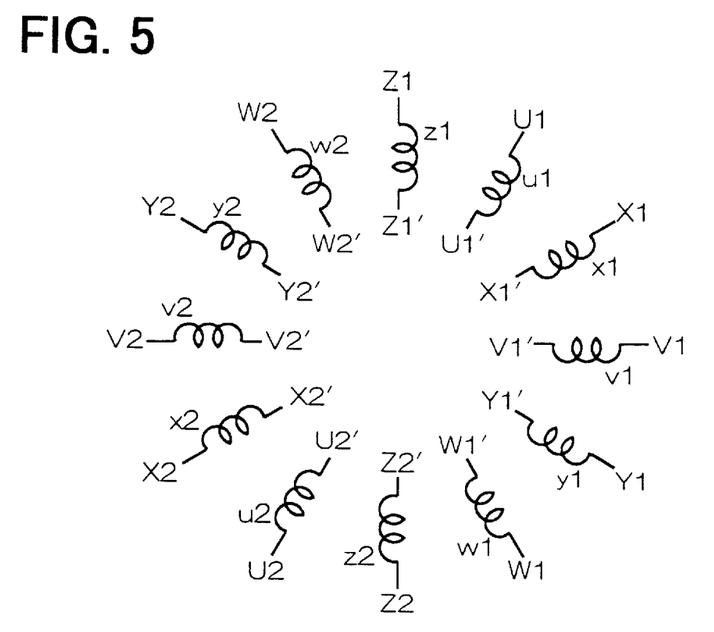
FIG. 5 is a schematic diagram illustrating 12 phase windings in order of the phase of the voltage induced therein.

As shown in FIG. 5, the stator winding 23 is comprised of 12 phase-windings x1, v1, y1, w1, z2, u2, x2, v2, y2, w2, z1 and u1. Each phase-winding is comprised of a plurality of (e.g. 8) pairs of the large and small conductor segments, as described above. The 12 phase windings 23 have, respectively, opposite winding ends, X1–X1', V1–V1', Y1–Y1', W1–W1', Z2–Z2', U2–U2', X2–x2', V2–V2', Y2–Y2', W2–W2', U2–U2' Z1–Z1' and U1–U1'.

Figure 6:
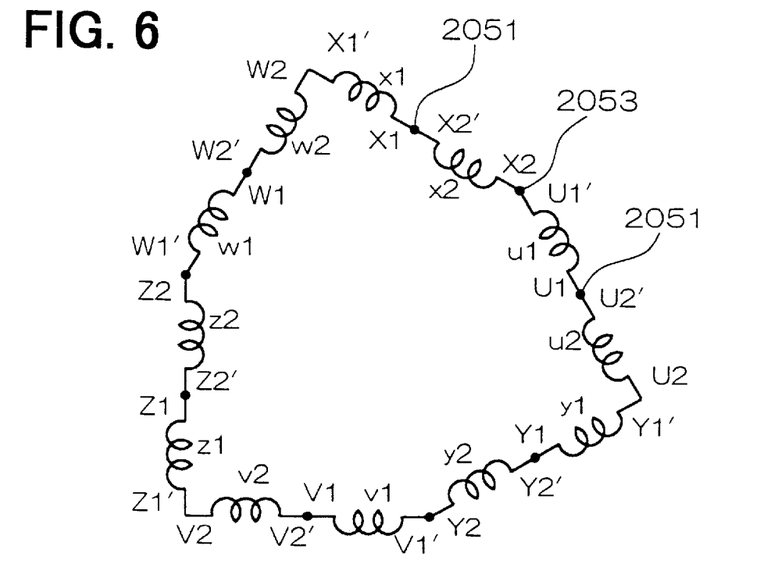
FIG. 6 is a schematic diagram illustrating Δ-connected stator winding that is formed of the 12 phase-windings shown in FIG. 5.
Figure 7:
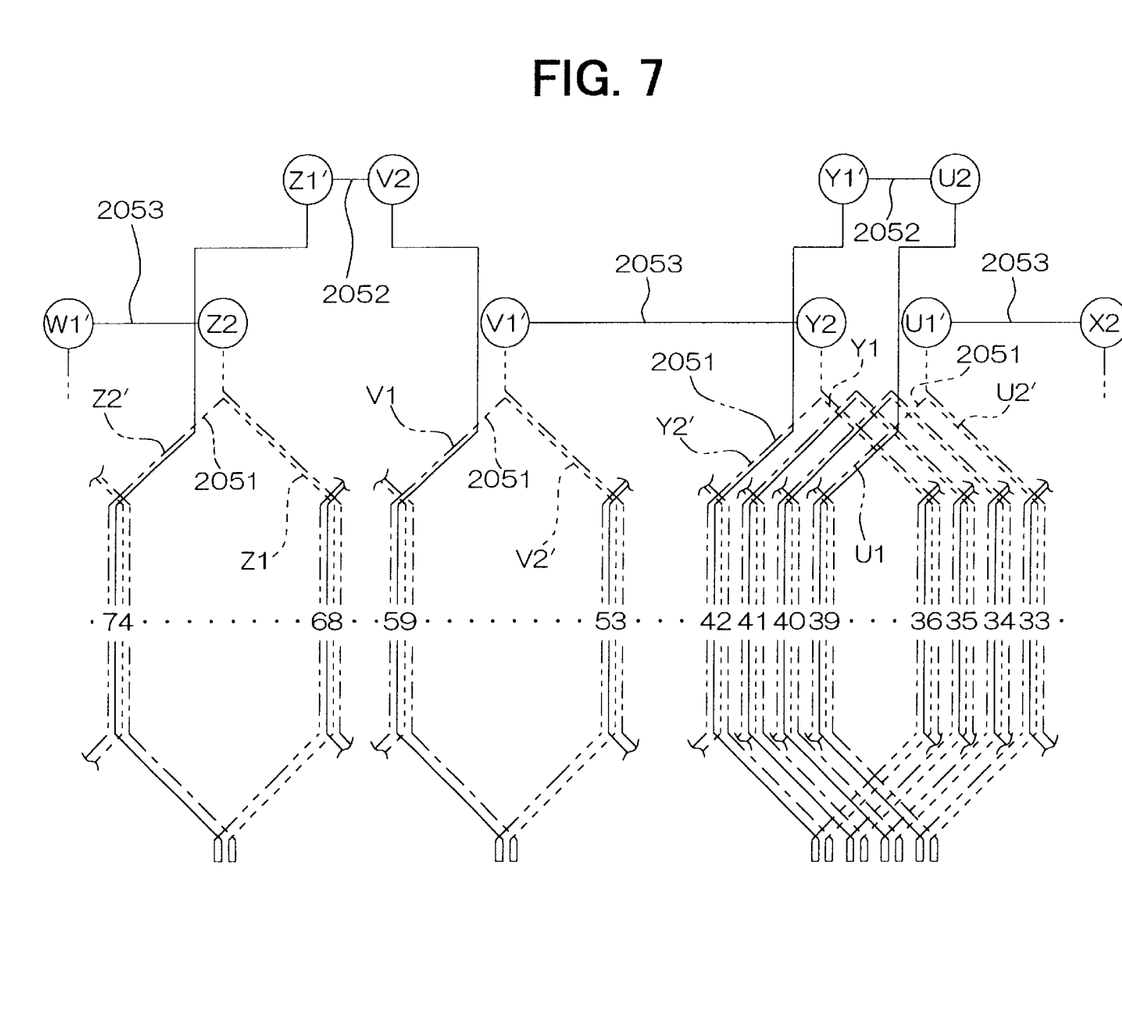
FIG. 7 is a winding diagram of the stator winding.

As shown in FIG. 6, the twelve phase windings form a Δ-connected stator winding that has three phase-winding groups. A first phase winding group is comprised of series connected phase windings x1, x2, u1 and u2. Because the phase windings x1 and x2 are a 180-degree electric angle different in phase from each other, they are inversely connected by a first connection segment 2051. The phase windings u1 and u2 are also a 180-degree electric angle different from each other and inversely connected by the first connection segment 2051. The phase windings x2 and u1, which are an angle other than 180-degree electric angle different in phase from each other, are also inversely connected by a third connection segment 2053. A second phase winding group is comprised of series connected phase windings y1, y2, v1 and v2. The phase windings y1 and y2 are a 180-degree electric angle different in phase from each other and inversely connected by the first connection segment 2051. The phase windings v1 and v2 are also a 180-degree electric angle different from each other and inversely connected by the first connection segment 2051. The phase windings y2 and v1, which are an angle other than 180-degree electric angle different in phase from each other, are also inversely connected by the third connection segment 2053. A third phase winding group is comprised of series connected phase windings z1, z2, w1 and w2. The phase windings z1 and z2 are a 180-degree electric angle different in phase from each other and inversely connected by the first connection segment 2051. The phase windings w1 and w2 are also a 180-degree electric angle different from each other and inversely connected by the first connection segment 2051. The phase windings z2 and w1, which are an angle other than 180-degree electric angle different in phase from each other, are also inversely connected by the third connection segment 2053.

Figure 8:
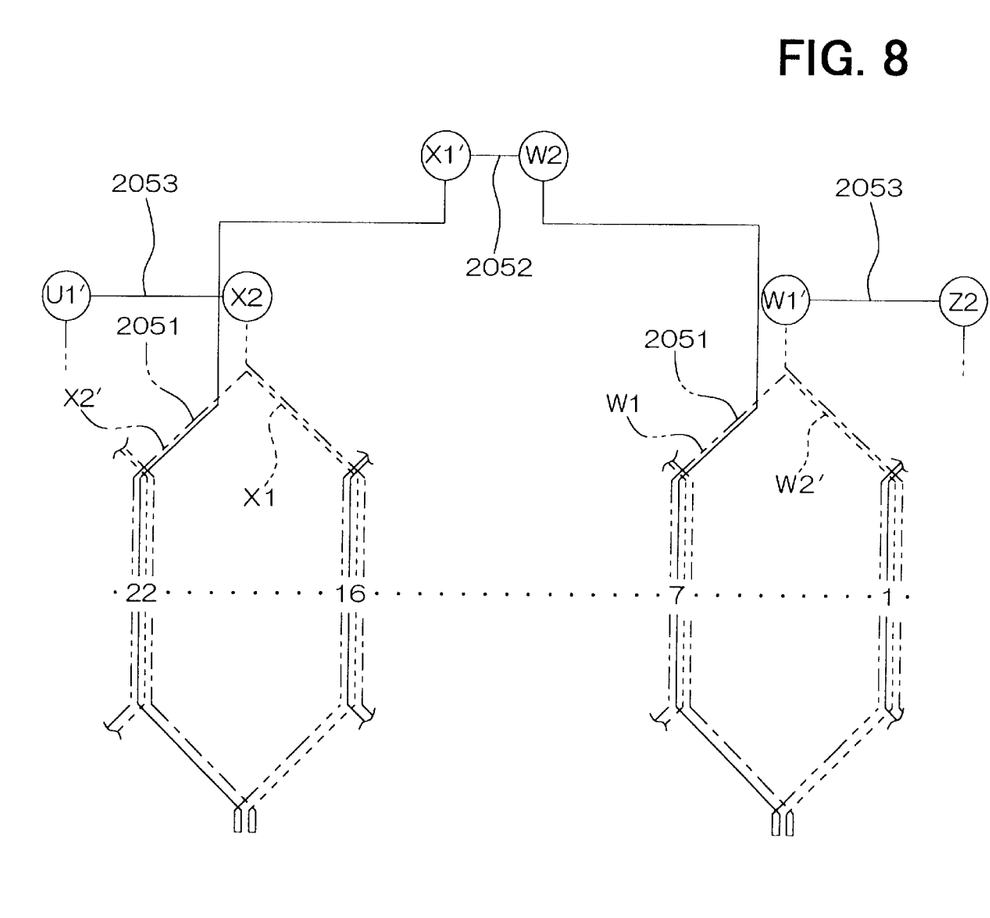
FIG. 8 is a winding diagram of the stator winding.
Figure 9:
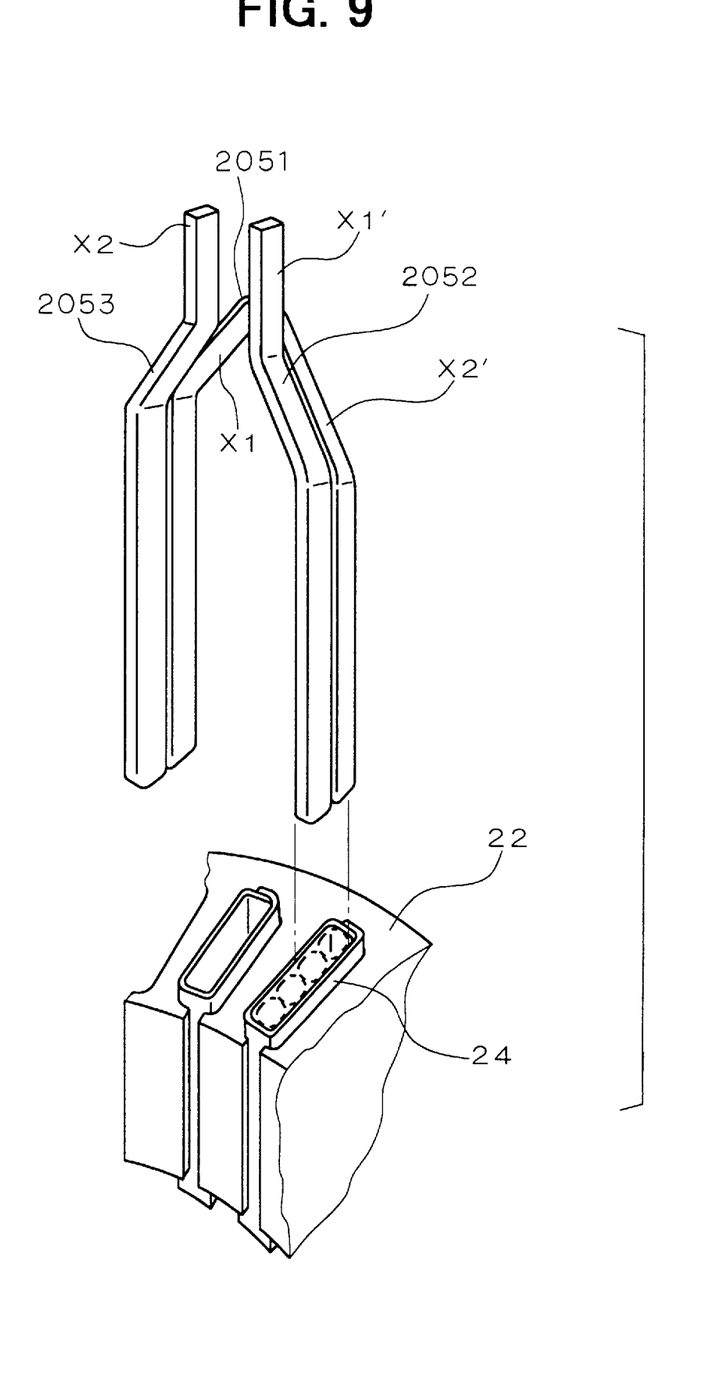
FIG. 9 is a schematic diagram showing a step of mounting specific segments in the stator core.
Figure 10:
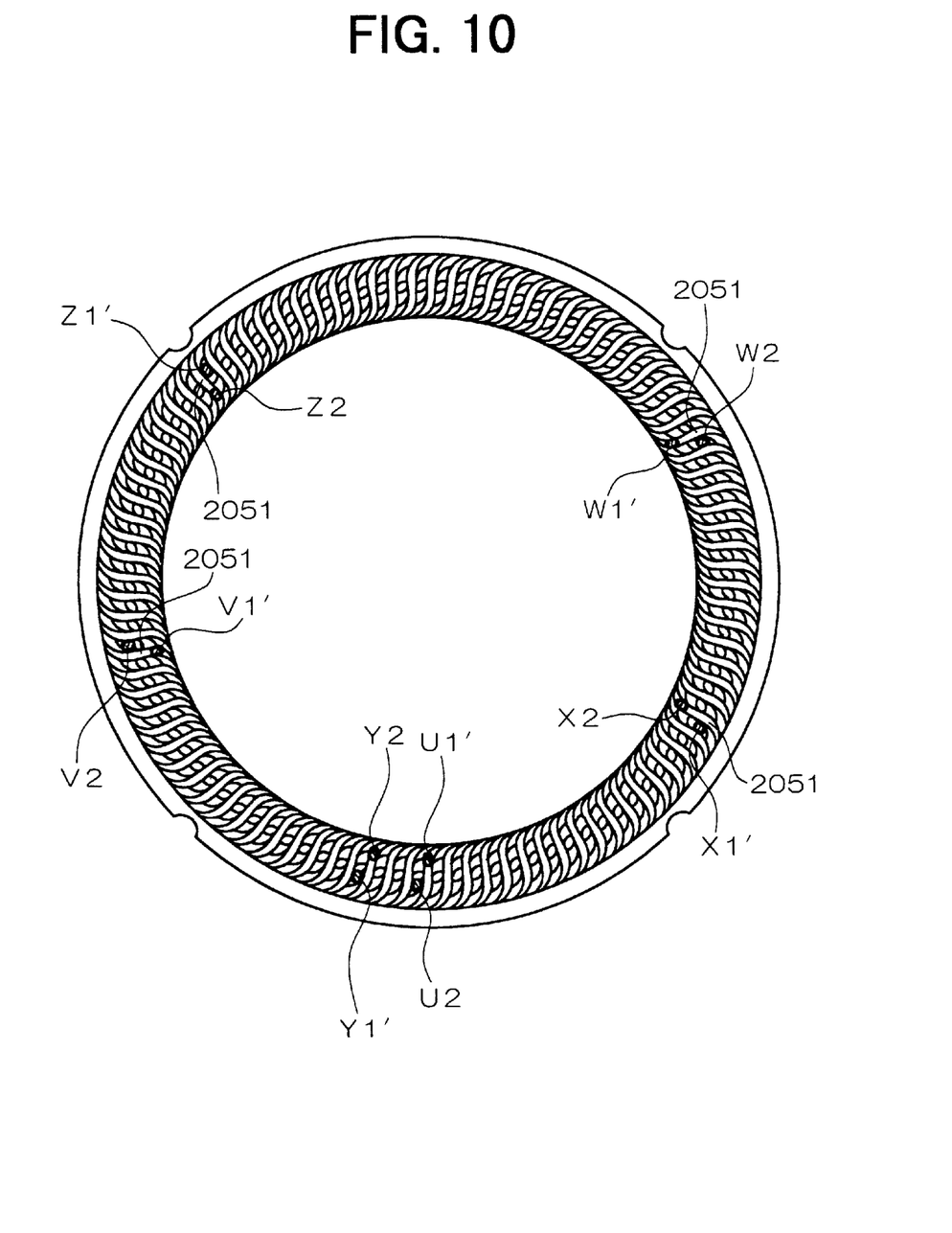
FIG. 10 is a plan view illustrating a stator of the vehicle AC generator shown in FIG. 1.

As shown in FIGS. 8 and 9, the winding end X2' of the phase winding x2 that extends from number 22 of the slots 25 and the winding end X1 of the phase winding x1 that extends from number 16 of the slots 25 are connected by the first connection segment 2051. The winding end X2 of the phase winding x2 is connected to the winding end U1' of the phase winding u1 by the third connection segment 2053.

Figure 11:
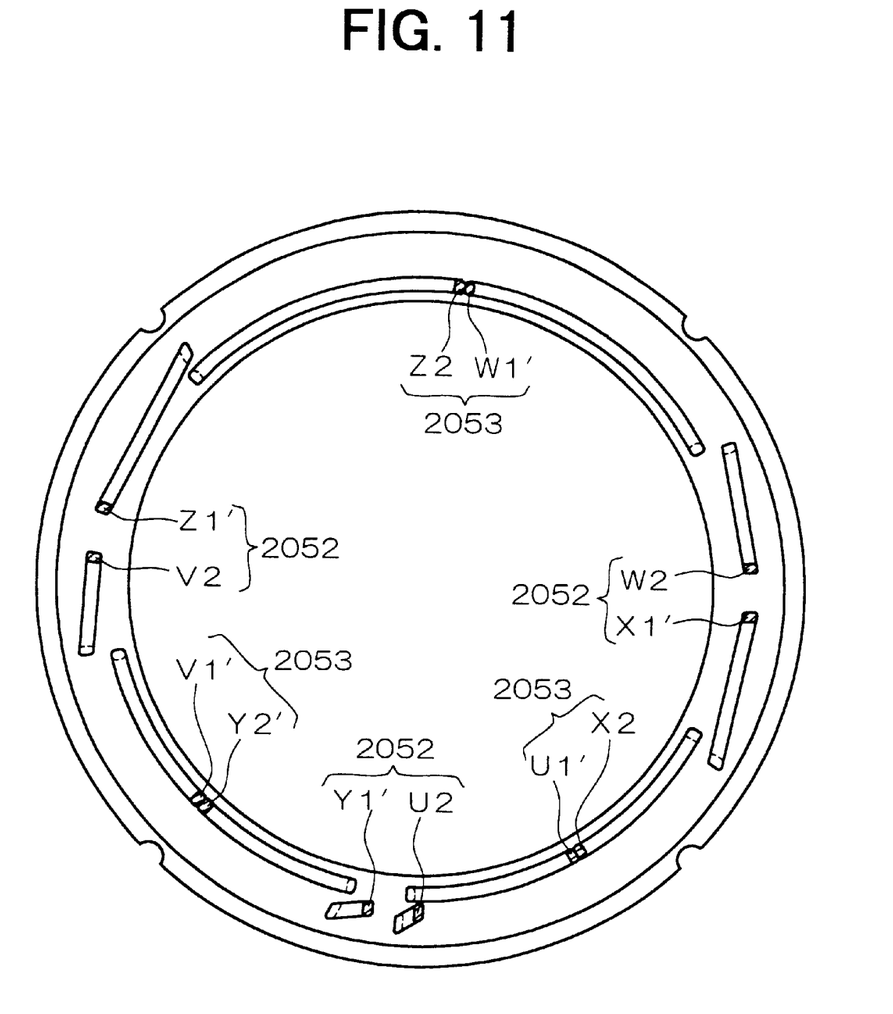
FIG. 11 is a schematic diagram illustrating wiring and connection of the phase windings on an end of the stator.
Figure 12:
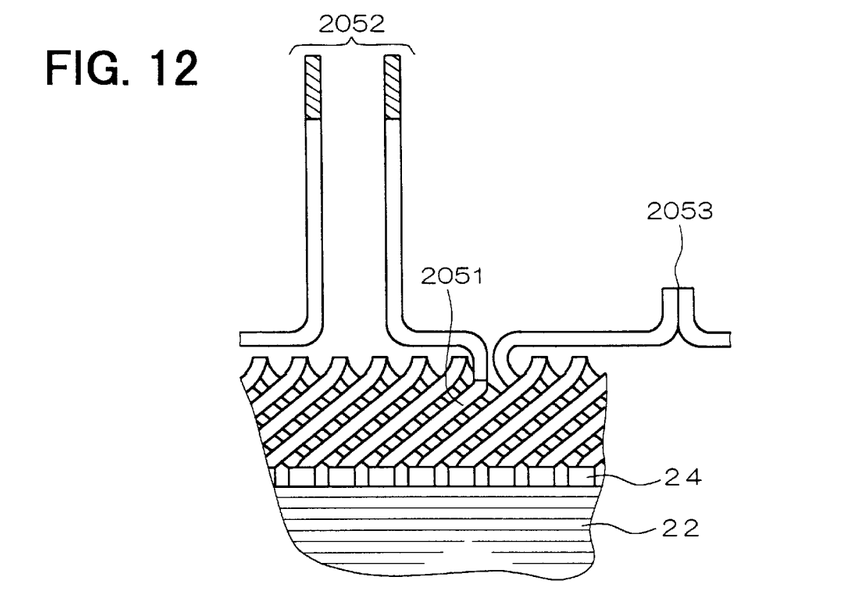
FIG. 12 is a fragmentary side view of the stator winding, and wiring and connection of the phase-windings.

As shown in FIGS. 8, 11 and 12, the winding end X1' of the phase winding x1 extends from number 22 of the slots 25 is connected to the rectifier unit 5 together with the winding end W2 of the phase winding w2 by a second connection segment 2052.

As shown in FIG. 11, the second and third connection segments 2052 and 2053 are disposed at three portions circumferentially spaced apart from each other and bonded to the first coil-end group by insulation epoxy resin. Therefore, wiring and connection can be made easy, and problems due to vibration of the vehicle AC generator can be minimized. The third connection segments are preferably disposed radially inside portion of the first coil-end group.

Figure 13:
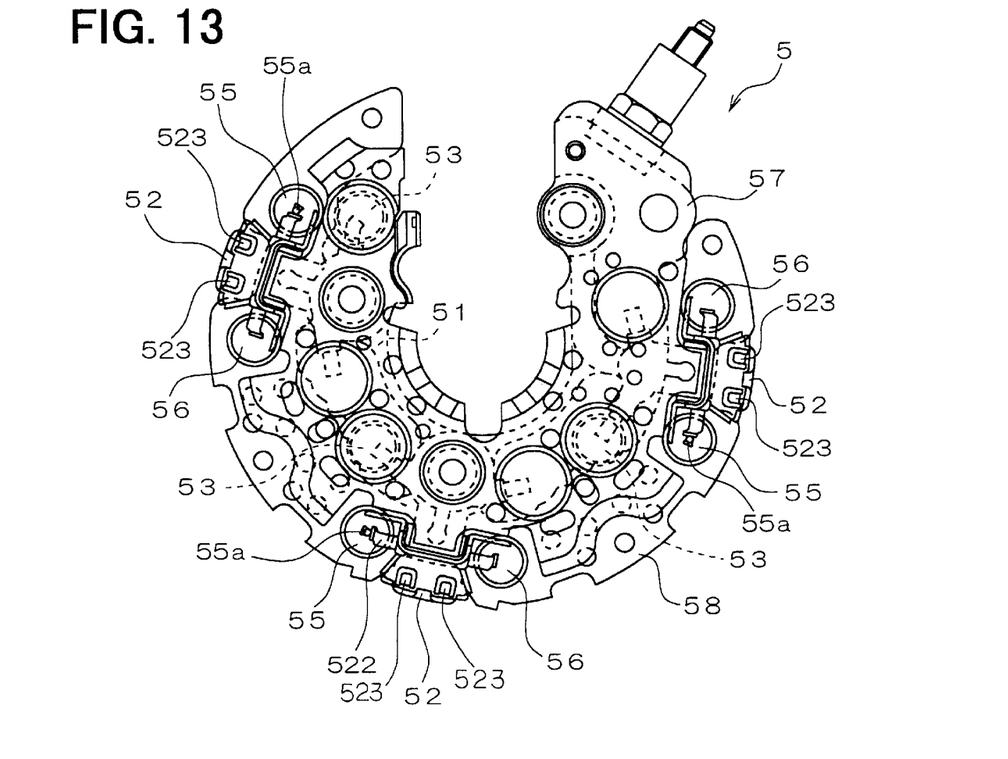
FIG. 13 is a plan view of a rectifier unit mounted in the vehicle AC generator shown in FIG. 1.
Figure 14:
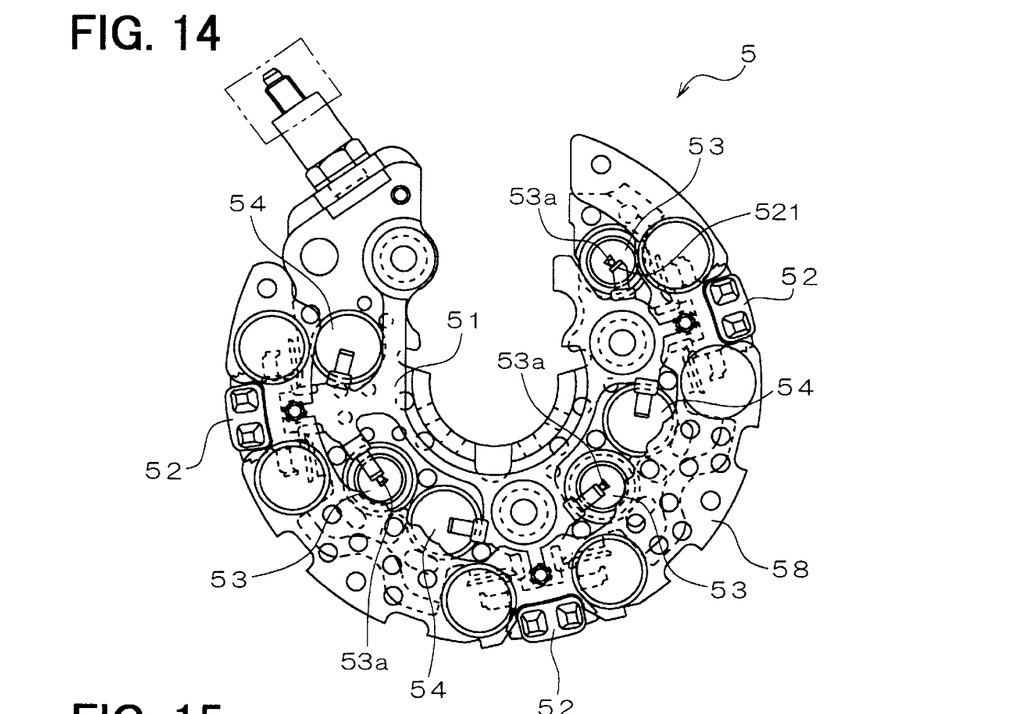
FIG. 14 is a rear view of the rectifier unit shown in FIG. 13.
Figure 15:
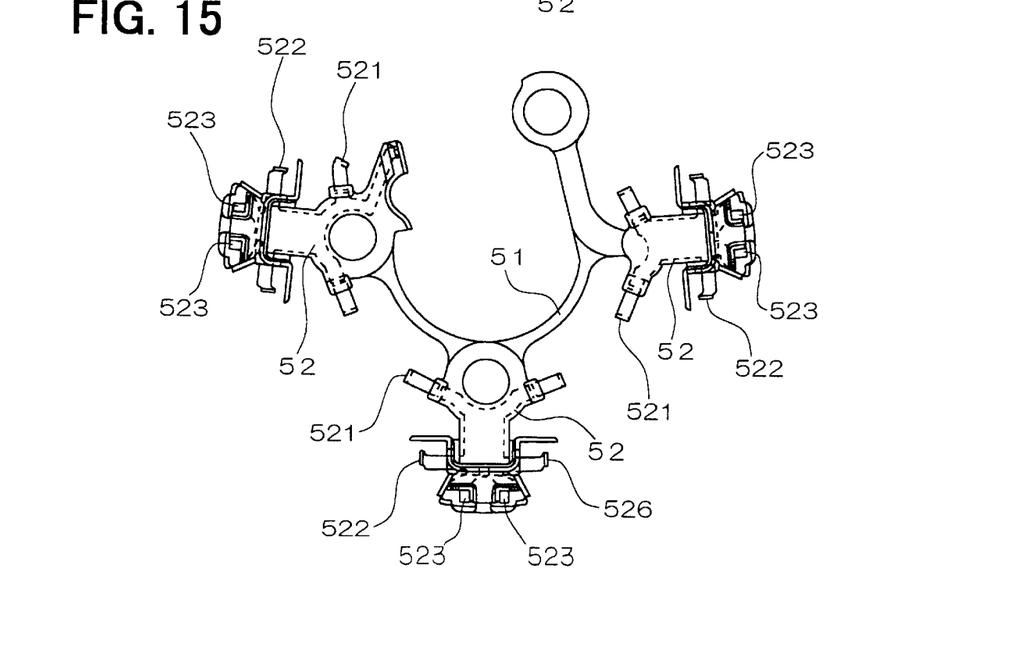
FIGS. 15 and 16 are plan views of a terminal unit of the rectifier unit shown in FIGS. 13 and 14.

As shown in FIGS. 13, 14 and 15, the rectifier unit 5 is comprised of a terminal unit 51 and a pair of positive and negative heat sinks 57 and 58, which sandwiches the terminal unit 51. The terminal unit 51 has three terminals 52. The positive heat sink 57 has three positive-side rectifier elements 53 on the surface facing the frame 4. Each of the rectifier elements 53 has a lead wire 53a that extends toward the frame and is connected to a terminal member 521 of one of the terminals 52 of the terminal unit 51 by TIG welding.

The negative heat sink 58 has three negative-side rectifier elements 55 on the rear surface thereof so that the lead wires 55a thereof extend rearward and are respectively connected to terminal members 521 of the terminals 52 by TIG welding.

Each terminal 52 has a pair of electrically connected terminal members 523 that connects corresponding two of the second connection segments 2053. Accordingly, when three pairs of the terminal members 523 connects three pairs of the second connection segments 2053, the Δ-connected stator winding that is connected to a three-phase full-wave rectifier bridge circuit is formed.

Figure 16:
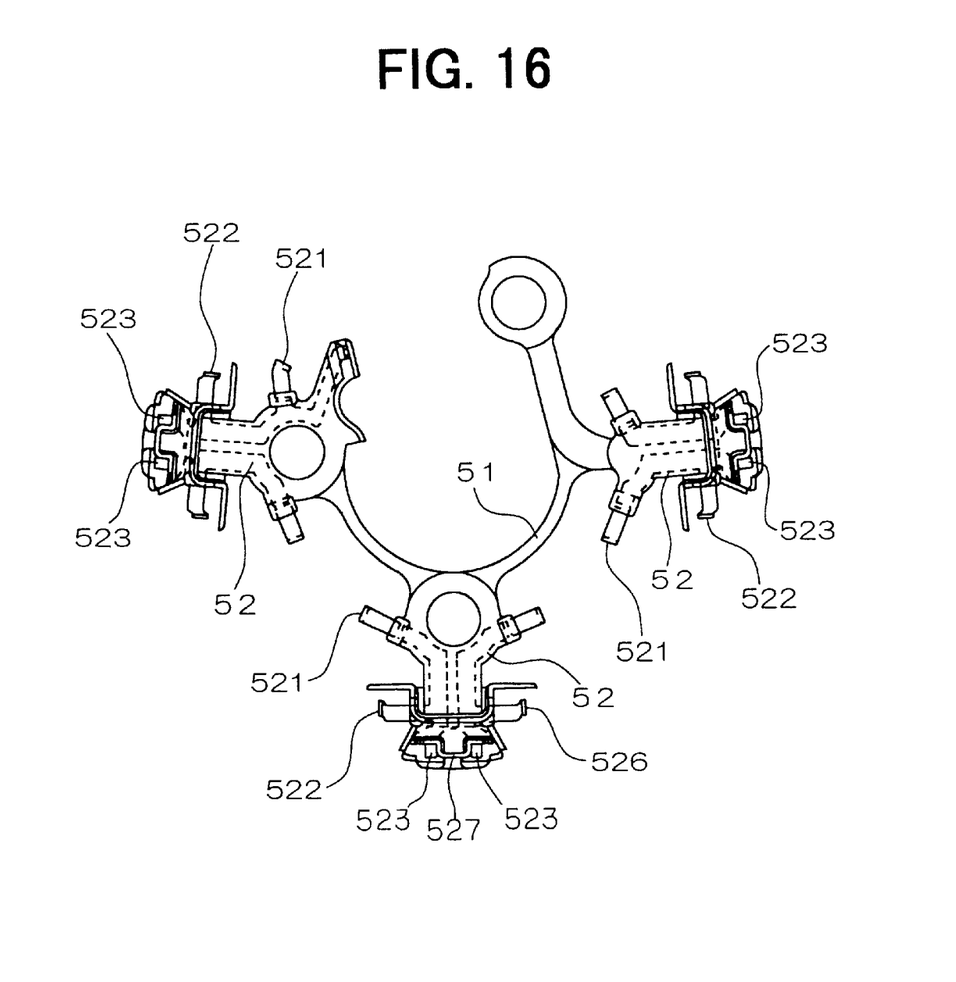

The positive heat sink 57 can have three other positive rectifier elements 54, and the negative heat sink 58 can have three other negative rectifier elements 56. Therefore, it is possible to provide six pairs of rectifying circuits to meet various requirements of a vehicle. In addition, as shown in FIG. 16, the terminal unit 51 has an extra terminal member 526 and a bypass member 527 for each terminal 52. Therefore, it is also possible to add other three rectifier elements, which are connected to the terminal members 527. In this case, the bypass members 527 have to be removed.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle AC generator comprising a rotor, a stator having a stator core and a Δ-connected stator winding disposed opposite said rotor, a rectifier unit connected to said stator winding, and a frame for supporting said rectifier unit, said rotor and said stator, wherein said stator winding comprises a plurality of phase-windings disposed in said stator core in a circumferential direction at equal intervals so that each of said phase-windings can generate AC voltage having a different phase from others, a plurality of first connection segments and a plurality of second connection segments, each said phase winding comprises a plurality of U-shaped conductor segments, each of said conductor segments has a turn portion forming a first coil-end group disposed on an end of said stator core and a pair of inclined portions forming a second coil-end group disposed on the other end of said stator core, each pair of said phase-windings that generates AC voltages a 180-degree-electric-angle different from each other is directly connected by one of said first connection segments to add said AC voltages thereby forming a series-connected phase-winding, and said series-connected phase-windings are directly connected by said second connection segments to form said Δ-connected stator winding, whereby, said first and second connection segments are disposed circumferentially spaced apart from each other.

2. The vehicle AC generator as claimed in claim 1, wherein said stator winding comprises 12 phase-windings that are different in phase from each other and a plurality of third connection segments for series connecting those of said phase windings other than said series connected phase windings connected by said first connection segments.

3. The vehicle AC generator as claimed in claim 2, wherein
said third connection segment extends along one of said coil end groups and disposed one of three portions circumferentially spaced apart from each other.

4. The vehicle AC generator as claimed in claim 1, wherein
at least a portion of said second connection segment extends along one of said coil-end groups.

5. The vehicle AC generator as claimed in claim 3, wherein
said third connection segment is bonded by resinous material to one of said coil-end groups.

6. The vehicle AC generator as claimed in claim 1, wherein
said first connection segment is integrated with one of said turn portions.

7. The vehicle AC generator as claimed in claim 2, wherein
said third connection segments are disposed radially inside portion of one of said coil-end groups.

8. The vehicle AC generator as claimed in claim 1, wherein
said rectifier element comprises a plurality of rectifier elements, a terminal unit having a plurality of terminals, and
said terminals and said stator winding are connected by said second connection segments.

9. A vehicle AC generator comprising a rotor, a stator having a stator core and a Δ-connected stator winding disposed opposite side rotor, a rectifier unit connected to said stator winding, and a frame for supporting said rectifier unit, said rotor and said stator, wherein:
said stator winding comprises a plurality of phase-windings generating voltage that are different in phase from each other and first and second connection segments are circumferentially spaced apart from each other for connecting said phase windings, each said phase winding comprising a plurality of conductor segments connected so that said stator winding includes a first coil-end group having turn portions at an end of said stator core and a second coil-end group having connection portions at the other end;
each pair of said phase-windings that generates AC voltages a 180-degree-electric-angle different from each other is directly connected by one of said first connection segments to add respective AC voltages; and
said connected phase-windings are directly connected by said second connection segment to form said Δ-connected stator winding.

10. The vehicle AC generator as claimed in claim 1, wherein said stator winding comprises 12 phase-windings that are 30 degrees in electric angle different from each other and a plurality of third connection segments for connecting two pairs of said phase windings connected by said first connection segments that are 30 degrees in electric angle different from each other.

* * * * *